Figure 1:
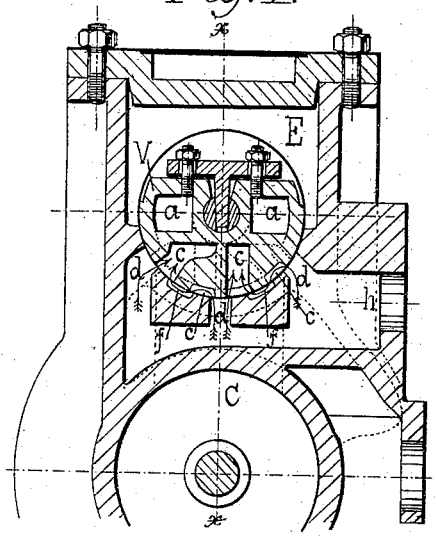

(No Model.) 2 Sheets—Sheet 1.

H. MOEHRING & A. PFLÜGER.
VALVE FOR STEAM OR OTHER ENGINES.

No. 383,406. Patented May 22, 1888.

Witnesses.
Joseph Holzamer.
Jacob Büchsel.

Inventors.
Hermann Moehring.
Albert Pflüger.

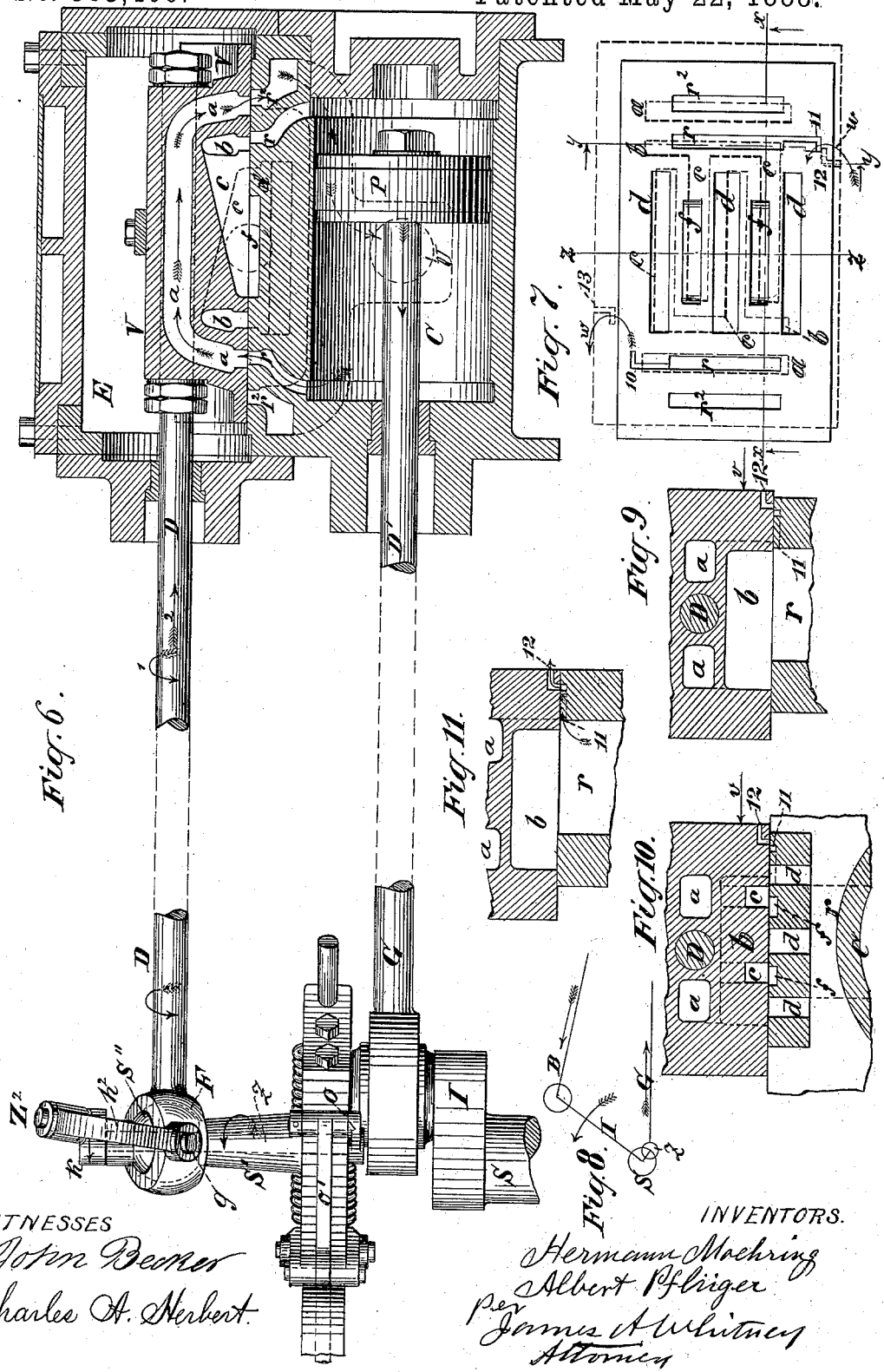

UNITED STATES PATENT OFFICE.

HERMANN MOEHRING AND ALBERT PFLÜGER, OF FRANKFORT-ON-THE-MAIN, PRUSSIA, GERMANY.

VALVE FOR STEAM OR OTHER ENGINES.

SPECIFICATION forming part of Letters Patent No. 383,406, dated May 22, 1888.

Application filed April 25, 1887. Serial No. 236,129. (No model.) Patented in England April 7, 1886, No. 4,859; in France April 7, 1886, No. 175,333; in Belgium April 7, 1886, No. 72,628; in Germany April 8, 1886, Nos. 37,554 and 40,827, and December 14, 1886, No. 41,921, and May 27, 1887, No. 41,378; in Italy June 30, 1886, No. 19,777, and June 30, 1887, No. 21,552, and in Austria-Hungary September 13, 1886, No. 14,984 and No. 41,064.

*To all whom it may concern:*

Be it known that we, HERMANN MOEHRING, a citizen of the United States, domiciled at Frankfort-on-the-Main, in the Kingdom of Prussia, Empire of Germany, and ALBERT PFLÜGER, a subject of the Emperor of Germany, of Frankfort-on-the-Main, in the Kingdom of Prussia, Empire of Germany, have invented a new and useful Improvement in Valves for Steam and other Engines, (for which patents have been granted as follows: in England April 7, 1886, No. 4,859; in Germany April 8, 1886, No. 37,554, May 27, 1887, No. 41,378, April 8, 1886, No. 40,827, and addition December 14, 1886, No. 41,921; in France April 7, 1886, No. 175,333, and addition March 31, 1887; in Austria-Hungary September 13, 1886, No. 14,984 and No. 41,064; in Italy June 30, 1886, No. 19,777, and addition June 30, 1887, No. 21,552, and in Belgium April 7, 1886, No. 72,628, and addition thereto March 31, 1887,) of which the following is a specification.

Our invention, designed for use in steam-engines and similar motors, includes in its operation a valve constructed and arranged to have a lateral movement in connection with the longitudinal movement, said movements, by their extent and character, determining the point of cut-off and the distribution of the steam or elastic fluid in the working of the engine or motor.

Our invention may be employed in a flat-faced valve arranged in due relation with a correspondingly-formed valve-seat and provided with means for giving the requisite longitudinal and lateral movements to the valve; but, as shown in the drawings forming part of this specification, it is employed with a valve so constructed and arranged that its lateral movement is of an oscillating character, the valve being of such contour as to rest upon and operate in connection with a valve-seat arc-shaped or semicircular in its cross-section.

The object of our invention is to retain the valve upon its seat with practically the minimum of pressure consistent with the requisite contact of the valve upon its seat under the exigencies of use and to secure the advantages which result from a lightness of pressure of the valve upon its seat.

Our invention comprises novel means, hereinafter fully set forth, whereby we effectually obtain the results desired.

Figure 2:
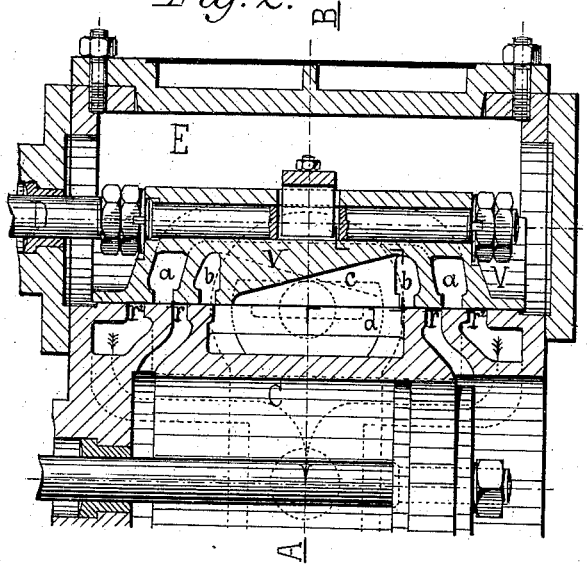
Figure 3:
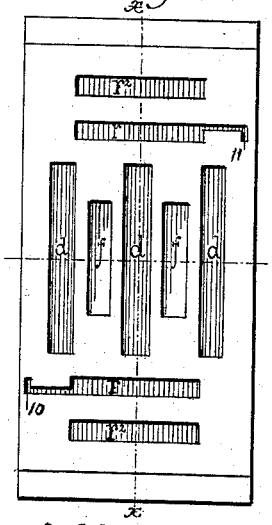
Figure 4:
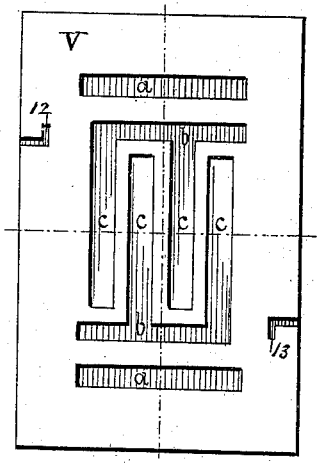
Figure 5:
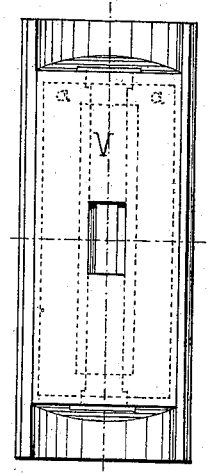

Referring to the drawings, Figure 1, Sheet 1, is a transverse sectional view, taken in the line A B of Fig. 2, of the valve, its seat, and steam-cylinder. Fig. 2 is a longitudinal sectional view taken in the line $x\,x$ of Fig. 3. Fig. 3 is a face view of the valve-seat unrolled. Fig. 4 is a similar view of the valve inverted and unrolled. Fig. 5 is a plan or top of the valve. Fig. 6 is a horizontal section of the engine having our improved construction, and showing in elevation means which may be used for giving the requisite combined movement to the valve. Fig. 7, Sheet 2, is a view as seen from the top of the valve and valve-seat, and illustrates the relation of said parts when in the position indicated in Fig. 6. Fig. 8 is a diagram showing the relative positions of the engine-crank and the eccentric device which give the combined movement to the valve. Fig. 9 is a transverse sectional view of the valve and of its seat, taken in the line $y\,y$ of Fig. 7, as seen from the direction of the arrows adjunctive to said line. Fig. 10 is a transverse sectional view of the valve and its seat, taken in the line $x\,x$ of Fig. 7. Fig. 11 is a transverse sectional view corresponding to Fig. 9, but showing the valve as moved to a different position.

The construction and operation of the apparatus shown in the drawings are as follows:

The piston P is connected by its piston-rod D' with the crank I of the engine-shaft S in the usual manner. Provided upon the crank, at the side opposite that by which it is attached to the shaft S, is an offset or return-crank, S', the axis of which is eccentric to that of the shaft S, and which, being carried around by the said shaft, constitutes a second crank, the rotation of which gives a longitudinal movement to the valve-rod D, hereinafter described. Therefore if no modifying agency were introduced the said valve would receive a simple to-and-fro motion like that of any ordinary slide-valve. In our invention, however, this longitudinal motion is modified by giving to the valve during or simultaneous with such longitudinal movement a lateral motion, the means for producing which we will hereinafter describe.

C is the steam-cylinder; D, the valve-rod; E, valve-chest, and V the slide-valve; $a\,a$, exhaust-passages, and $b\,b$ and $c\,c\,c\,c$ steam-admission passages in the slide-valve; $d\,d\,d$, longitudinal passages in the valve-seat, communicating with and receiving the entering steam from the steamway $h$; $f\,f$, longitudinal cavities or passage-ways in the valve-seat; $r\,r$, steam passages or ports to the cylinder, and $r^2\,r^2$ exhaust or eduction ports from the cylinder.

As is readily seen, we have in this construction placed the transverse steam and exhaust ports near the extremities of our valve and valve-seat, while the longitudinal passages are placed in the middle. The valve-seat is furnished with two exhaust-passages, $r^2\,r^2$, and the exhaust-passage in the slide-valve has two entrances, $a\,a$. The steam entering at $h$ passes through the ports and passages $d\,d\,d$, $c\,c$, $b\,b$, and $r\,r$ to the steam-cylinder, finding thus admission to the latter without entering the valve-chest. The valve-chest is therefore in no direct communication with the steam-passages, and has also no communication with the exhaust-passages or outside atmosphere. It would, therefore, receive no steam at all were it not for the passages 10 and 11 in the valve-seat and 12 and 13 in the valve-face, by means of which, however, it communicates once in every stroke for a short time with the steam end of the steam-cylinder, receiving thus from the latter a supply of steam of a certain desired pressure, in the manner and for the purpose that we shall presently describe.

Before proceeding hereto, we remark that by the arrangement of the ports and passages, as described above, we obtain a very equal distribution of pressure over our valve surface and reduce the waste-room in the passages.

Returning, now, to the passages 10, 11, 12, and 13, we remark that 10 and 11 may be either through passages to the steam-cylinder or they may be grooves or cavities leading to and forming steamways to the passages $r\,r$, and communicating thus through the latter with the steam-cylinder, while similarly the passages 12 and 13 may also be either through passages or grooves in the slide-valve face, leading or forming passages to the valve-chest.

Our valve receives the two motions previously described, and by the resulting elliptical motion thus obtained the passages 12 and 13 of the slide-valve slide over the passages 10 and 11 of the cylinder-valve face, so that, in one stroke of the engine, 12 is brought for a very short time in communication with 10, and in the next stroke, similarly, 12 with 11. During the short period of time wherein 13 is in communication with 10 the steam end of the steam-cylinder is therefore in communication with the valve-chest, allowing steam to pass from one to the other, and thus equalizing the pressure between them. The same takes place during that period of the other stroke wherein 12 is in communication with 11. The object which we accomplish hereby is to give and retain in the valve-chest a pressure sufficient to overcome the pressure exerted to lift the valve from its seat by the steam entering at $h$ and yet not exceeding such pressure more than is necessary to insure the valve being pressed on its seat sufficiently to be steam-tight.

It is manifest that the pressure in the valve-chest required to fulfill the above conditions should be less than the initial pressure of steam entering at $h$, because the valve on its face is not exposed throughout its whole surface to this pressure, a portion of the surface being exposed merely to the exhaust-pressure, and a portion to an average lower pressure than that of the initial steam. It is also manifest that by opening a communication between the steam-cylinder and the valve-chest at such a period after steam is cut off from the cylinder, expansion has taken place and the pressure has fallen to that which we desire to give to the valve-chest. The latter will receive this pressure and, as the passages 10 13 and 11 12 are only open for a very short period, will retain it, any variation being equalized at the next stroke, when the passages are again opened and shut rapidly.

As we give 10, 11, 13, and 12 the proper position to open and shut the communication between the steam-cylinder and valve-chest when the steam-pressure in the former is such as we desire, we accomplish our purpose of pressing our valve on its seat with the moderate pressure required, and no more. This novel method of relieving the valve from useless pressure and wear, and reducing the power required to move it, is free from the great faults inherent to the means which have hitherto been employed—such as equilibrium-valves, which, when unadjustable, wear leaky in a short time, and when adjustable, require skill, experience, and constant attention.

The means for producing the lateral movement of the valve to determine the point at which the cut-off shall occur are shown in Fig. 6, and these we will now describe. On the second crank, S', is a spherical boss or bearing, S'', on which is placed a strap, F, internally corresponding to the rounded surface of said boss or bearing. This strap F is that which connects the valve-rod D with said second crank and which will enable said second crank to give the requisite to-and-fro movement to the valve and valve-rod. The strap F, in a line substantially at right angles to that of the valve-rod, is provided with projecting pins or studs $g$, which provide pivotal connections for the ends of a yoke, $h^2$, which is placed aside of said strap F. If we give a turning movement to the valve-rod to turn the valve laterally upon its seat, such turning movement is readily permitted by reason of the universal joint formed by the globular boss or bearing S'' and the coincident strap F. To give the turning motion to the valve-rod, the second crank, S', is made tubular from end to end, and has placed within it a stem or shaft, indicated at $z$ in dotted outline in Fig. 6, and capable of turning around its own axis within said secondary crank. Upon the projecting outer end of this stem $z$ is a crank-arm, $k$, which carries an inclined eccentric-pin, $Z^2$, which is inserted into a hole or bearing formed in the arch or center of the yoke $h^2$. The arrangement of parts is such that the inclined eccentric-pin, acting through the yoke, holds the strap F in a position oblique to the axis of the secondary crank. As the latter is carried around by the rotation of the shaft S, the effect is to give a turning movement to the valve-rod upon its own axis, said rod turning in the direction of the arrow shown in Fig. 6. When the secondary crank, S', is in the position shown in said figure and turning in the opposite direction, then said crank assumes an opposite position. By turning the stem $z$ the position of the eccentric-pin $Z^2$ with reference to the secondary crank, S', is changed to vary the time at which such turning movement of the valve-stem occurs. To automatically provide for such adjustment of the eccentric-pin to actuate the valve-stem according to the requirements of the engine, the stem $z$ has at its inner end a crank-arm, O, which, by means of a link, $o'$, or other device, may be connected with a speed-governor of any suitable kind. The longitudinal movement of the valve controls the distribution— i. e., the ingress and egress—of the steam, and the turning or lateral movement of the valve determines the point of cut-off. This will occur if the ports of the valves are of any arrangement by which their opening or closing is controlled by the said lateral movement of the valve, and such an arrangement is herein shown and illustrated; but to make the valve having these characteristics a balanced valve we construct the valve and its valve-seat with certain auxiliary ports or passages, whereby at the proper time and in the proper manner steam is admitted to the valve-chest to counterbalance the steam-pressure on the face of the valve. We do not, however, limit ourselves to the means herein shown and described for giving the requisite longitudinal movement to the valve to open and close the inlet and exhaust ports and the lateral movement requisite to determine the point at which the cut-off shall occur, as means by which said movements may be given to the valve may be varied within wide limits and are largely a matter of choice.

We claim—

1. A valve constructed and arranged to receive combined longitudinal and lateral movements, having main ports to govern the admission of steam to the cylinder by one motion of the valve and to govern the cut-off of steam by the other motion thereof, and a valve-seat having main ports arranged to act in conjunction with the main ports of the valve, substantially as described.

2. A valve constructed and arranged to receive combined longitudinal and lateral movements, having main ports to govern the admission of steam to the cylinder by one motion of the valve and to govern the cut-off of steam by the other motion thereof, and having adjunctive ports or passages 12 13, a closed valve-chest external to said valve, and a valve-seat having main and adjunctive ports or passages 10 11, arranged to act in conjunction with the main and adjunctive ports or passages of the valve, the whole in combination and for operation, substantially as and for the purpose herein set forth.

HERMANN MOEHRING.
ALBERT PFLÜGER.

Witnesses:
JOSEPH HOLZAMER,
JACOB BÜCHSEL.